United States Patent [19]

Swanson et al.

[11] Patent Number: 5,466,418

[45] Date of Patent: Nov. 14, 1995

[54] SYSTEM FOR THE REMEDIATION OF HIGHLY CONTAMINATED SOILS

[75] Inventors: Malcolm L. Swanson, Chickamauga, Ga.; Wendell R. Feltman, Chattanooga, Tenn.; Robert E. Schreter, Roswell, Ga.

[73] Assignee: Astec Industries, Inc., Chattanooga, Tenn.

[21] Appl. No.: 91,339

[22] Filed: Jul. 13, 1993

[51] Int. Cl.⁶ .................................................. B01J 8/08
[52] U.S. Cl. .................... 422/111; 422/168; 422/182; 422/183; 431/5; 405/258
[58] Field of Search ................ 427/32, 111, 168, 427/182, 183; 431/5; 47/1.42; 405/258

[56] References Cited

U.S. PATENT DOCUMENTS

| | | | |
|---|---|---|---|
| 4,332,478 | 6/1982 | Binz | 366/4 |
| 4,782,625 | 11/1988 | Gerken et al. | 47/1.42 |
| 4,951,417 | 8/1990 | Gerken et al. | 47/1.42 |
| 5,129,334 | 7/1992 | Mize | 110/246 |
| 5,302,118 | 4/1994 | Renegar et al. | 432/14 |
| 5,350,252 | 9/1994 | Musil et al. | 405/258 |

OTHER PUBLICATIONS

Eclipse Inc., *Application Report*, AR-64, Aug., 1971.
Eclipse Inc., *Application Report*, AR-68, Aug., 1971.
Eclipse Inc., Combustion Division, *Process Heating Application Report*, AR-70, Oct., 1971.
Eclipse Inc., *Application Report*, AR-77, Feb., 1972.
Eclipse Inc., Combustion Division, *Process Heating Application Report*, AR-80, Sep., 1972.

Primary Examiner—Timothy M. McMahon
Attorney, Agent, or Firm—Nilles & Nilles

[57] ABSTRACT

A low-temperature thermal desorption (LTTD) system remediates highly contaminated soils. The system (1) reduces the concentration of vaporized contaminants exhausted from the primary treatment unit (PTU) and (2) precisely controls the concentration of vaporized contaminants exhausted from the PTU so as to permit the safe oxidization of contaminants in a secondary treatment unit without oversizing the secondary treatment unit or the baghouse. The concentration of vaporized contaminants exhausted from the PTU is reduced by drawing the vaporized contaminants into a low-pressure region of the PTU so as to contact the burner flame and by supplying this area of flame contact with a modulated supply of air to oxidize a designated portion of the vaporized contaminants within the PTU. The concentration and temperature of the remaining vaporized contaminants are controlled by monitoring the concentration of the contaminants in the gas stream exhausted from the PTU, by calculating a lower explosive limit (LEL) of the contaminant concentration, and by providing a modulated supply of heated dilution air to the gas stream to precisely reduce contaminant concentration levels in the gas stream to a desired percentage of the calculated LEL.

15 Claims, 4 Drawing Sheets

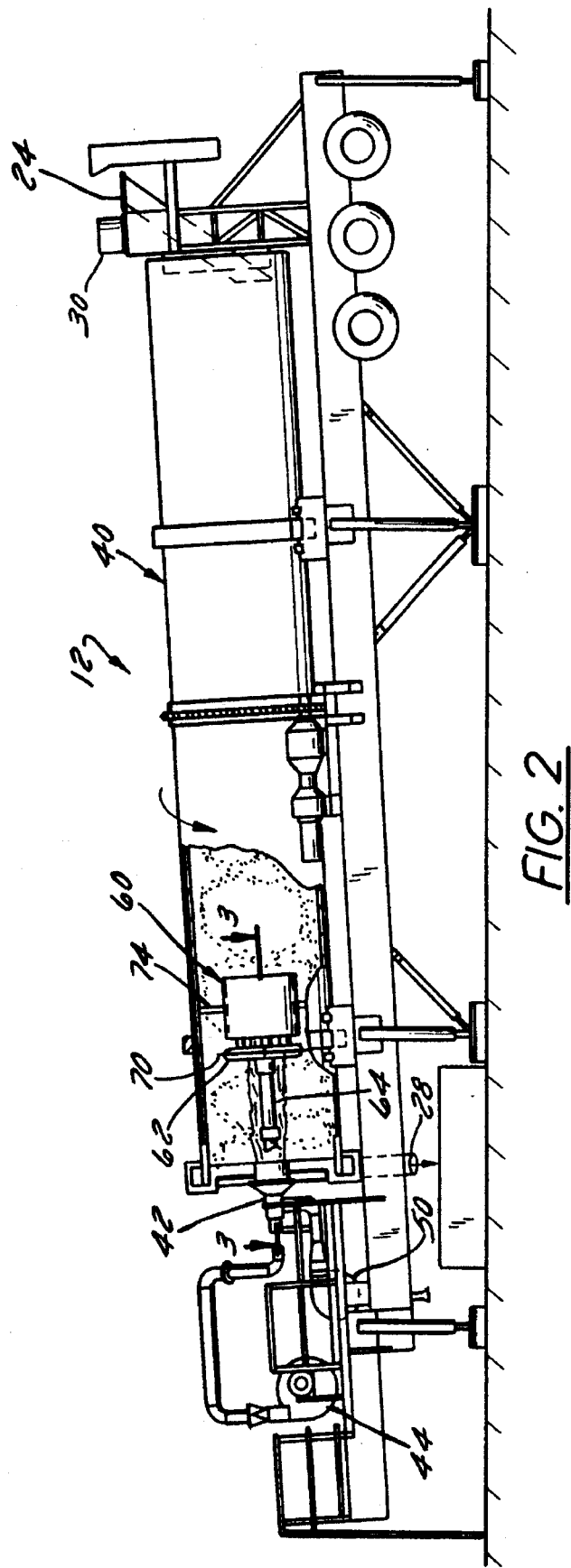

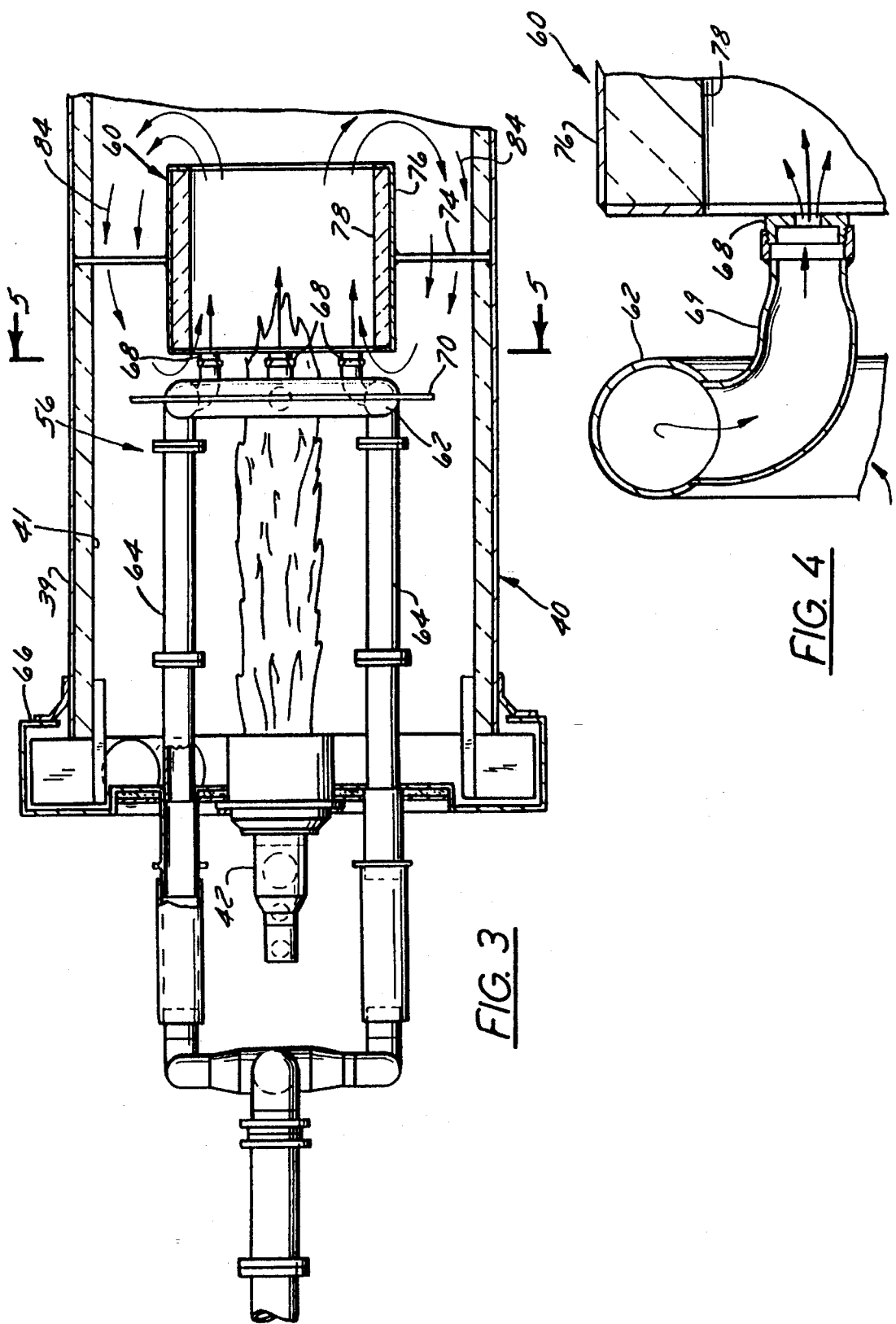

SYSTEM FOR THE REMEDIATION OF HIGHLY CONTAMINATED SOILS

BACKGROUND OF THE INVENTION

1. Field of the Invention

The invention relates to soil remediation systems and processes and, more particularly, relates to a system and process for remediating highly contaminated soil by low temperature thermal desorption.

2. Discussion of the Related Art

Soils at a large number of both abandoned and operating industrial sites are contaminated with waste oil, fuel oil, and a variety of other combustible or even explosive organic substances. The demand for the remediation of such soils has increased at the same time that remediation has become increasingly problematic. More specifically, both public awareness of the dangers of on-site storage of such substances and government regulations prohibiting the continued storage of such substances has required the clean-up of sites that have stored large quantities of such substances for many years. This clean-up must extend in the case of each site beyond the substances themselves to the remediation of thousands of tons of soil contaminated with such substances. However, dwindling landfill space and increasingly strict government regulations have rendered more difficult the treatment of such soil. The two methods commonly employed for remediating soils are high-temperature incineration and low-temperature thermal desorption.

High-temperature incineration subjects materials to sufficiently high temperatures to alter the molecular structure of most of the materials subject to the process, thus forming a concentrated ash. This process, though capable of remediating even highly contaminated soils, suffers from several drawbacks and disadvantages. High-temperature incineration requires the consumption of large quantities of fuel and thus is relatively expensive. Moreover, by destroying all organic materials in the soils, incineration may render treated soils unsuitable for reuse in some applications.

Low-temperature thermal desorption (LTTD) does not alter the molecular structure of soils but instead removes contaminants from the soils by forced evaporation in a heated drum forming a primary treatment unit (PTU). The vaporized volatiles are then exhausted from the PTU and oxidized in a separate high temperature afterburner requiring much less fuel than an incineration system.

LTTD is often preferred to high-temperature incineration for a variety of reasons. Primary soil treatment by the PTU of an LTTD system occurs at relatively low temperatures of 500°–800° F. and thus requires dramatically less fuel than incineration systems. LTTD also does not require equipment to be modified to operate under extremely high temperatures required for incineration. Accordingly, LTTD systems are more economical than incineration units both in terms of capital investment and operating costs. Moreover, the treated soils are unchanged apart from having the organic materials destroyed and thus are suitable for return to the site, further reducing operating costs.

One problem with LTTD systems is that petroleum and similar contaminants are highly combustible or even explosive when in their vaporized state. Accordingly, when removed by vaporization in the PTU of an LTTD system, the levels of such contaminants must be maintained at levels well below their lower explosive limit (LEL). Contaminant concentrations above this limit could cause explosions in the ductwork leading to the afterburner. Thus, LTTD systems, though in most instances preferred over incineration systems for reasons described above, were heretofore thought unsuited for the treatment of highly contaminated soils which typically contain in excess of 3–4% by weight of hydrocarbons or other volatile organic substances. In fact, it was heretofore thought LTTD systems could not be used to remediate safely soils containing more than 1–2% by weight of such substances. Controlled treatment of soils having contaminant concentrations above this level was thought impossible because it was thought that such treatment could cause the gas stream fed to the STU to contain contaminant levels approaching or even rising above the LEL, thus creating the danger of an explosion before dilution air could be added to the gas stream. Accordingly, LTTD systems could heretofore handle highly contaminated soils only if such soils were diluted with clean soils prior to treatment to reduce the contaminant concentration levels to the maximum permissible operating range of 1–2%. This dilution requirement has heretofore rendered LTTD systems uneconomical for treatment of large quantities of highly contaminated soils.

OBJECTS AND SUMMARY OF THE INVENTION

An object of the invention is to provide a system for the remediation of highly contaminated soil by low-temperature thermal desorption (LTTD).

Another object of the invention is to provide a system of the type described above which requires reduced quantities of the fuel and which does not require the contaminated soil to be blended with clean soil prior to remediation.

In accordance with a first aspect of the invention, these objects are achieved by providing a system comprising a primary treatment unit, a burner, and an air injection system. The primary treatment unit has a contaminated soil inlet, a remediated soil outlet, and an exhaust gas outlet. The burner heats the interior of the primary treatment unit to vaporize contaminants in the soil. The air injection system injects air into the primary treatment unit between the inlet and the outlet so as to oxidize at least some of the vaporized contaminants within the primary treatment unit, thereby reducing contaminant levels in the primary treatment unit to safe levels.

Preferably, the air injection system comprises a blower, an injector located in the primary treatment unit, a variable restriction damper which controls the flow of air from the blower to the injector, and means for varying the amount of restriction provided by the damper. The means for controlling may comprise a motor which is connected to the damper, a first sensor which monitors the flow of air from the blower towards the injector, a second sensor which monitors the rate at which contaminated soil is fed into the primary treatment unit, and a controller which receives signals from the first and second sensors. The controller includes means for determining an optimum flow rate of air to be supplied to the injector and for transmitting a signal to the motor to set the amount of restriction provided by the damper to provide the optimum air flow rate.

The air injection system preferably comprises a manifold non-rotatably mounted within the primary treatment unit and a plurality of nozzles ejecting air from the manifold into the primary treatment unit. In order to facilitate contaminant oxidation, a cylinder may be mounted in the primary treatment unit proximate the nozzles so as to present an open interior receiving flames from the burner and air from the nozzles and an exterior directing eddy currents, formed between the cylinder and an inner periphery of the primary treatment unit, towards the burner.

Still another object of the invention is to provide a LTTD system capable of safely operating at levels closer to the LEL of the vaporized contaminants than could systems which were heretofore available.

In accordance with another aspect of the invention, this object is achieved by providing a system including a primary treatment unit of the type described above, and means for supplying dilution air to the exhaust gases. Means may also be provided for (1) sensing the level of contaminants in the exhaust gases, (2) calculating a lower explosive limit of the exhaust gases, and (3) determining a flow rate of dilution air required to maintain the level of contaminants in the exhaust gases below a predetermined percentage of the lower explosive limit. Also provided are means for controlling the means for supplying to supply the determined flow rate of dilution air to the exhaust gases.

Yet another object of the invention is to provide a LTTD process exhibiting the advantages of the system described above.

In accordance with yet another aspect of the invention, this object is achieved by feeding the contaminated soil into a primary treatment unit, heating the contaminated soil in the primary treatment unit and vaporizing the contaminants, and injecting air into the primary treatment unit and oxidizing at least some of the vaporized contaminants.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIG. 2 is a side elevation view of the primary treatment unit and associated elements of the LTTD system of FIG. 1;

FIG. 3 is a sectional plan view taken along the lines 3—3 in FIG. 2;

FIG. 4 is a detail view of a portion of the assembly illustrated in FIG. 3; and

DETAILED DESCRIPTION OF THE PREFERRED EMBODIMENTS RESUME

Pursuant to the invention, a low-temperature thermal desorption (LTTD) system is provided for remediating highly contaminated soils. The system (1) reduces the concentration of vaporized contaminants exhausted from the primary treatment unit (PTU) and (2) precisely controls the concentration of vaporized contaminants exhausted from the PTU so as to permit the safe oxidization of contaminants in a secondary treatment unit without oversizing the secondary treatment unit or the baghouse. The concentration of vaporized contaminants exhausted from the PTU is reduced by drawing the vaporized contaminants into a low-pressure region of the PTU so as to contact the burner flame and by supplying this area of flame contact with a modulated supply of air to oxidize a designated portion of the vaporized contaminants within the PTU. The concentration and temperature of the remaining vaporized contaminants are controlled by monitoring the concentration of the contaminants in the gas stream exhausted from the PTU, by calculating a lower explosive limit (LEL) of the contaminant concentration, and by providing a modulated supply of heated dilution air to the gas stream to precisely reduce contaminant concentration levels in the gas stream to a desired percentage of the calculated LEL.

System Overview

Figure 1:
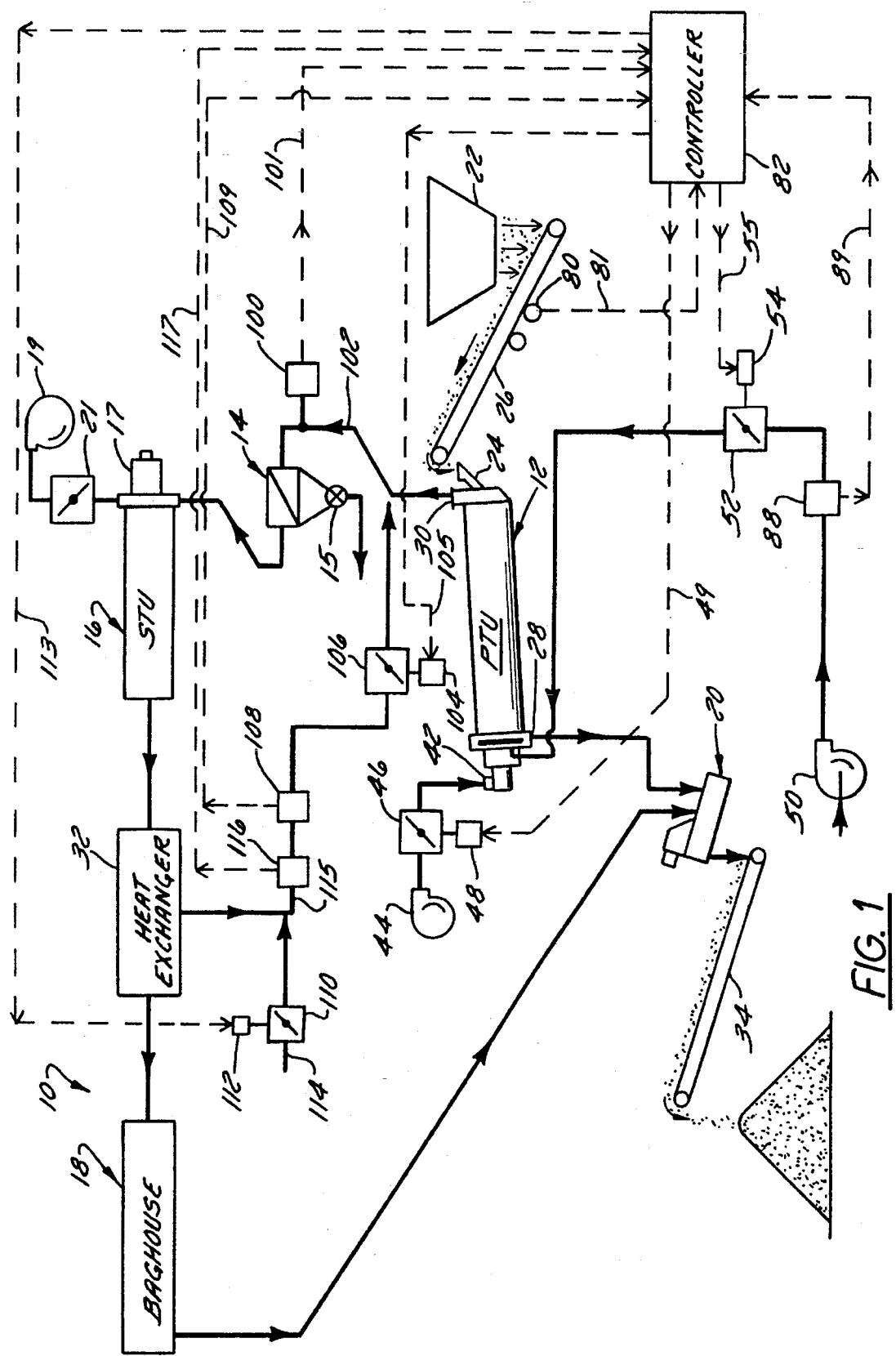
FIG. 1 schematically illustrates an LTTD system constructed in accordance with the preferred embodiment of the invention.
Figure 5:
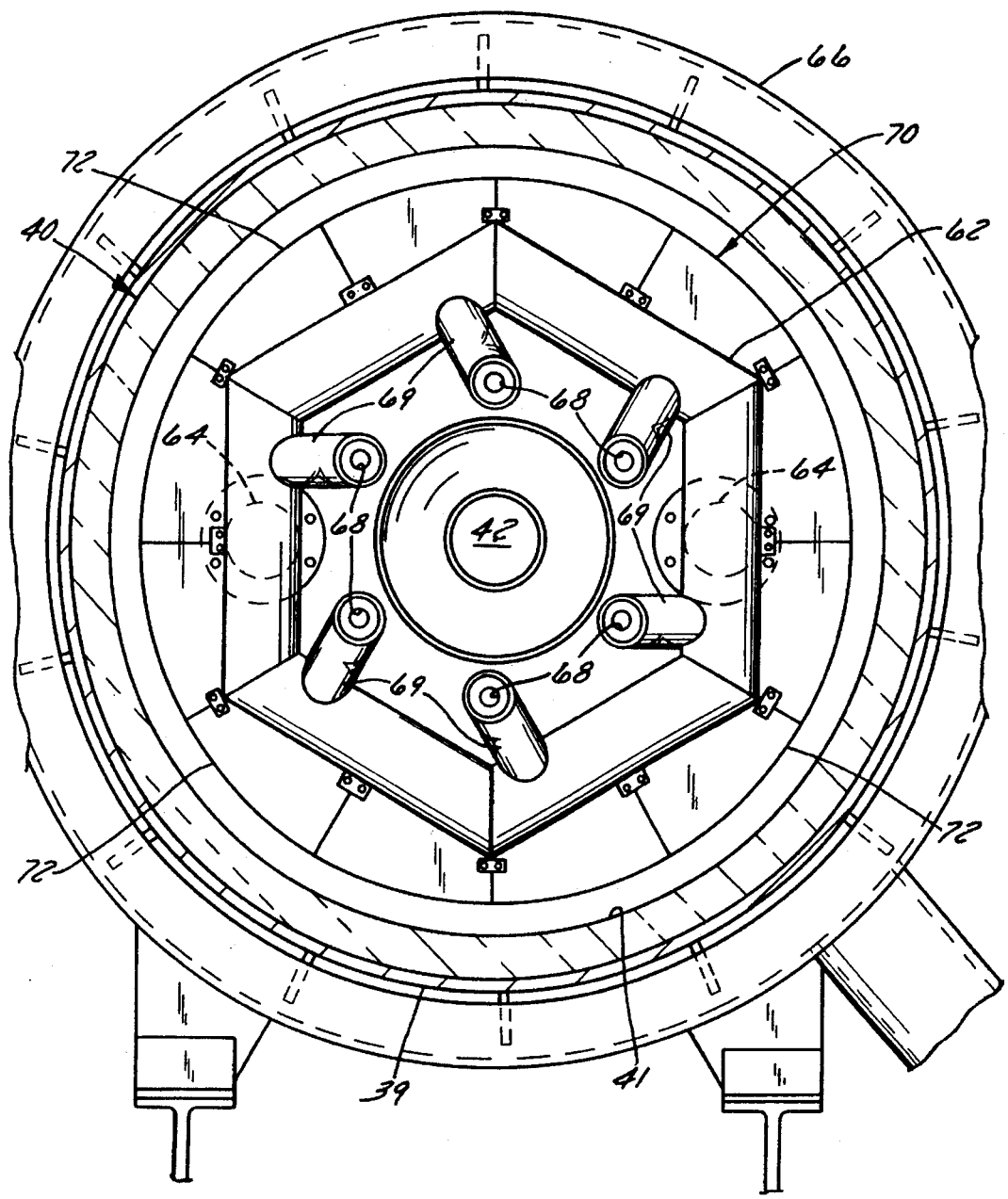
FIG. 5 is a sectional end view taken along the lines 5—5 in FIG. 3.

Referring now to the drawings and to FIG. 1 in particular, a low-temperature thermal desorption (LTTD) system 10 is adapted to remediate highly contaminated soil. That is, system 10 is capable of remediating soil containing in excess of 3–4% by weight of petroleum products or other combustible and/or explosive volatile organic substances. System 10 could, of course, also be used to remediate soil having much lower concentrations of contaminants.

LTTD system 10 includes as its major components a primary treatment unit (PTU) 12 for the low-temperature thermal treatment of contaminated soil, a dust separator 14 for removing the larger particles of dust entrained by the exhaust gases from the PTU 12, and a secondary treatment unit (STU) 16 for oxidizing vaporized contaminants in the exhaust gas stream received from the dust collector. Also provided are a heat exchanger 32 which employs indirect heat transfer to cool the gases exhausted from STU 16 while preheating air for other system components, a baghouse 18 in which the particles from the STU 16 are separated from the gas stream, and a mixer in the form of a pugmill 20.

In use, contaminated soil is fed from a holding bin 22 to an inlet 24 of the PTU by a feed conveyor 26. The soil in bin 22 should be pretreated by screening and the like and should be blended so as to have relatively uniform known contaminant and moisture concentrations of, e.g., 4% and 2%, respectively. The soil fed into the PTU 12 is remediated in a manner detailed below, and is then discharged from a remediated soil outlet 28 of the PTU 12 to the pugmill 20.

Exhaust gases from the PTU, laden with vaporized contaminants produced during the LTTD process, are discharged from an exhaust outlet 30 in the PTU and mixed with dilution air to reduce the contaminant concentration in the gases to a desired percentage of the lower explosive limit (LEL). The dilution air is preferably preheated by heat exchanger 32 so as to reduce the energy required for operation of STU 16 and to inhibit hydrocarbon condensation in the ductwork leading to the STU. At least the larger particles of dust entrained by the gas stream are then separated by gravity in the dust separator 14 comprising a so-called multi-cone cyclone type separator or the like, discharged from an outlet 15 of the separator, and conveyed to the pugmill 20. The gas stream exiting the separator 14 is fed to the STU 16 where a direct-fired burner 17, supplied with oxygen by a burner 19 and a damper 21, provides supplemental energy and oxygen to heat the gases to temperatures ranging from 1400°–1800° F. such that the contaminants are oxidized primarily to carbon dioxide and water. The gas stream is then fed to heat exchanger 32 where it is cooled to a temperature of, e.g., 350° F. by indirect contact with the ambient air, and is then directed to the baghouse 18 where the remaining dust is removed. This dust is then conveyed to the pugmill 20 and mixed with the soil from PTU 12 and the dust from separator 14, and then discharged from the system by a discharge conveyor 34.

Pursuant to the invention, the system is designed to remediate safely soil with contaminant concentration levels above the upper explosive limit (UEL). PTU operation under these conditions is permitted by reducing contaminant concentrations to acceptable levels prior to feed to the STU by 1) oxidizing a portion of the contaminants in the PTU, and 2) adding dilution air to the gas stream as it is exhausted from the PTU. Each of these operations is monitored and controlled so as to promote safe operation of the entire system with the exhaust gases delivered to the STU having contaminant concentration levels closer to the LEL than was heretofore considered practical. Each of these features will now be described in detail.

Construction and Operation of the Primary Treatment Unit

Referring now to FIGS. 1–3, the PTU 12 includes a rotary drum 40 formed from a cylindrical shell 39 at least the inner end of which is lined with a refractory liner 41. Drum 40 has formed therein the contaminated soil inlet 24, the remediated soil outlet 28, and the exhaust gas outlet 30. Rotary drum 40 is inclined downwardly from the soil inlet to outlet ends thereof so as to promote movement of the soil upon rotation of the drum towards a burner 42 heating the outlet end of the drum. Burner 42 is supplied with air from a blower 44 through a variable restriction damper 46 the degree of opening of which is controlled by a motor 48. Drum 40 is also supplied with air from an injection air system comprising a blower 50, a damper 52 the degree of opening of which is controlled by a motor 54, and an injector 56 positioned within the drum 40.

A controller 82 is also provided which cooperates with sensors and other devices detailed below to control the motors 48 and 54 as well as a motor 104 also detailed below.

Burner 42 is supplied with a controlled flow of air by the blower 44 and the damper 46, under the transmission of an actuation signal 49 from the controller 82, so as to operate at very close to a stoichiometric air/fuel ratio, and thus introduces little if any unused oxygen into the drum 40. Thus, unless excess air were injected into the drum 40, few if any contaminants would be oxidized within the PTU 12. It is for this reason that the air injection system including the blower 50, the damper 52, the motor 54, and the injector 56 is provided. The injector 56 cooperates with an internal cylinder 60 of the drum 40 and is designed to supply a controlled flow of air into a fuel-rich zone of the drum 40 so as to burn some of the vaporized contaminants in the drum, thereby reducing the concentration of contaminants in the gases within the drum 40 before they are exhausted from the drum.

Injector 56 comprises a manifold 62 fixed to a pair of spaced supply pipes 64 which are in turn mounted on a stationary shroud 66 covering the outlet end of drum 40 and having the outlet 28 extending therefrom. A plurality of nozzles 68 are mounted on supply pipes 69 extending from the manifold 62 and inject air into the interior of cylinder 60. Damage to the manifold 62 from heat supplied by the burner 42 is prevented by a heat shield 70 mounted on the manifold 62 and formed from a plurality of segmented plates 72 connected to one another in any suitable manner.

Cylinder 60 is designed to facilitate oxidation of vaporized contaminants by directing the vaporized contaminants into the portion of the flame from the burner 42 which is supplied with injection air. To this end, the cylinder 60 is mounted in the interior of drum 40 by a support 74 so as to rotate with the drum. Cylinder 60 comprises an outer shell 76 formed from stainless steel or the like and an inner liner 78 formed from a suitable refractory material. Support 74 may be any strut-like or web-like structure which positions the cylinder 60 in the center of drum 40 as illustrated and which permits unobstructed movement of soil and gases through the drum 40 between the outer periphery of the cylinder 60 and the inner periphery of the drum 40.

In use, contaminated soil to be treated is fed into the inlet 24 of the drum 40 of the PTU 12 by feed conveyor 26 at a controlled rate. In the inlet 24, the soil is directed through gases flowing towards exhaust outlet 30, thereby cooling the gases to below their autoignition temperatures. The contaminated soil is then conveyed through the drum 40 at a rate determined by the speed of rotation of the drum and by the inclination of the drum. If desired, the speed of rotation can be controlled by controller 82 based upon a signal 81 representing the instantaneous rate that materials are fed into the drum as sensed by a weigh bridge 80 or the like positioned under the feed conveyor 26.

The contaminated soil is progressively heated as it is conveyed through the drum 40 to a final temperature of 500°–800° F. at the discharge end of the drum. During this process, contaminant evaporation typically begins at a location just to the right of the cylinder 60 as viewed in the drawings and is completed before the remediated soil is discharged from outlet 28 of drum 40. This soil, having been heated to only relatively low temperatures, is suitable for reuse at the site from which it was taken.

The contaminant concentration levels in PTU 12 are typically higher than their UEL. To reduce these levels towards an acceptable percentage of the LEL, air is injected from the injector 56 into the interior of the cylinder 60 simultaneously with the transfer of soil through the drum 40. This air supplies sufficient oxygen to oxidize a percentage of the vaporized contaminants released from the soil, thereby (1) releasing added heat to aid in soil remediation without supplying additional fuel to the burner 42, and (2) decreasing contaminant concentration levels in the exhaust gases discharged from outlet 30 to safe levels. The cylinder 60 facilitates this combustion by being positioned such that a low static pressure is created at the burner end of the cylinder 60 relative to its other end, thus creating eddy currents around the outer periphery of the cylinder 60 in the direction of arrows 84 in FIG. 3 and directing the vaporized contaminants to the flame from the burner 42.

The amount of air supplied by the injector 56 is closely monitored by a suitable sensor 88 such as a pressure sensor, a feedback signal 89 from which is transmitted to controller 82. The controller 82 uses feedback signals 89 and 109 to control the injection of air into the PTU 12 and the supply of dilution air to duct 102 (in a manner detailed below) to provide sufficient contaminant oxidation to reduce the contaminant concentration in the gas stream exhausted from the PTU to a target level of 50% of the LEL. Typically, if soil having 4% contaminants by weight is being treated, the controller 82 will control the injector 56 to supply enough air to oxidize 25% of the vaporized contaminants in the soil.

This airflow rate is determined based upon 1) a manually input indication of the contamination level of the soil being remediated, and 2) the instantaneous flow of materials into the drum as monitored by weigh bridge 80. Based on these inputs, controller 82 energizes motor 54 to set the damper 52 at a position at which sensor 88 detects whether air is being supplied to the drum 40 at the desired rate. The calculations performed by controller 82 to determine the desired rate are relatively simple and thus will not be detailed.

It can thus be seen that supplying a controlled amount of injection air into the primary treatment unit 12 reduces the level of contaminant concentration in the gas stream exhausted from the unit, thus permitting the handling of contaminant concentrations that would otherwise cause explosive conditions to exist. This controlled supply of injection air also reduces the amount of fuel required to remediate the soil by liberating energy in the PTU which would otherwise be wasted in the STU.

Preferably, measures are also taken to control more precisely the contaminant concentrations in the gas stream entering the STU 16, thereby permitting the system to operate at contaminant concentration levels approaching more closely the LEL. Such measures will now be described.

Construction and Operation of Dilution Air Control System

Referring again to FIG. 1, the concentration of contaminants exhausted from the PTU, though reduced through oxidation of a percentage of the contaminants in the PTU as discussed above, typically are still at or approaching the LEL. These concentration levels are reduced still further in a controlled manner by monitoring the contaminant concentration levels in the duct 102 connecting the PTU to the STU, by calculating the LEL, and by supplying a modulated flow of dilution air to duct 102 at the outlet of the PTU 12 so as to reduce precisely the contaminant concentration level to an acceptable percentage of the LEL before the gases are fed to the STU 16.

To permit this controlled supply of dilution air, a flame ionization detector (FID) 100 is provided in the duct 102 connecting the PTU 12 to the dust collector 14. The FID 100 detects the level of combustibles in the exhaust gas stream and transmits a signal 101 representative of this value to the controller 82. Controller 82 receives the signal 101 from the FID 100 and determines the LEL as well as the amount of dilution air required to reduce the contaminant concentration level in duct 102 to a desired percentage of the LEL. These calculations are well known to those skilled in the art and thus will not be detailed. The controller 82 then transmits a signal 105 to a motor 104 which actuates a variable restriction damper 106 to modulate the flow of heated air from the heat exchanger 32 to the duct 102. Energization of motor 104 is terminated when a pressure sensor 108 located upstream of the damper 106 detects that air is flowing through the damper 106 at the required rate and transmits an appropriate signal 109 to the controller 82.

The heated dilution air supplied to conduit 102 is also cooled so as to assure that the temperature of the gases in the duct 102 remains below the autoignation temperature of about 400° F. To this end, a variable restriction damper 110 can be operated under the control of a motor 112 to supply a controlled flow of ambient air from an inlet duct 114 into the duct 115 supplying heated air from the heat exchanger 32 to duct 102. In use, air at a temperature of about 800° F. flowing through the duct 115 from heat exchanger 32 is cooled to about 350° F. by actuating motor 112 to control the damper 110 so as to admit sufficient ambient air into the duct 115 to reduce the temperature of this air to the desired level. This temperature is closely monitored by a suitable temperature sensor 116, a feedback signal 117 from which is transmitted to controller 82 for actuating motor 112.

In addition to reducing the contaminant concentration levels in the exhaust gas stream to safe levels, supplying a precisely monitored controlled flow of dilution air to the duct 102 permits operation of the STU at levels closer to the LEL than heretofore thought safe. For instance, systems heretofore available typically operated at 25% of projected LELs or less, while a LTTD utilizing the inventive dilution air supply system can safely operate at 50% of the calculated LEL. This permits the capacity of the STU 16, heat exchanger 32, and baghouse 18 to be cut in half, thus significantly decreasing the size of the system as well as the capital expense and operational expenses of the system.

Many changes and modifications could be made to the present invention without departing from the spirit and scope thereof. For instance, the PTU need not necessarily employ a counterflow drum as illustrated, but could instead employ a so-called parallel flow drum in which contaminated soil is fed into the burner-end of the drum. Moreover, the cylinder for aiding oxidation of vaporized materials from the PTU need not be provided in the form illustrated and could even be deleted if desired. The air injection system could similarly be replaced with any system providing a controlled flow of air into the PTU. Other changes and modifications which could be made without departing from the spirit and scope of the invention will become more readily apparent from the reading of the appended claims.

We claim:

1. A system for the remediation of highly contaminated soil, comprising:

a primary treatment unit having a contaminated soil inlet, a remediated soil outlet, and an exhaust gas outlet;

a burner which heats the interior of said primary treatment unit to vaporize contaminants in said soil; and an air injection system which injects air into said primary treatment unit between said inlet and said outlet so as to oxidize at least some of said vaporized contaminants within said primary treatment unit.

2. A system as defined in claim 1, wherein said air injection system comprises:

a blower;

an injector located in said primary treatment unit;

a variable restriction damper which controls the flow of air from said blower to said injector; and means for varying the amount of restriction provided by said damper.

3. A system as defined in claim 2, wherein said means for varying comprises a motor which is connected to said damper;

a first sensor which monitors the flow of air from said blower towards said injector;

a second sensor which monitors the rate at which contaminated soil is fed into said primary treatment unit; and a controller which receives signals from said first and second sensors, said controller including means for determining an optimum flow rate of air to be supplied to said injector and for transmitting a signal to said motor to set the amount of restriction provided by said damper to provide said optimum air flow rate.

4. A system as defined in claim 1, wherein said air injection system comprises a manifold non-rotatably mounted within said primary treatment unit and a plurality of nozzles ejecting air from said manifold into said primary treatment unit.

5. A system as defined in claim 4, wherein said air injection system further comprises a shield which shields said manifold from said burner.

6. A system as defined in claim 4, further comprising a cylinder which is mounted in said primary treatment unit proximate said nozzles, which presents an open interior receiving flames from said burner and air from said nozzles, and which presents an exterior directing eddy currents, formed between said cylinder and an inner periphery of said primary treatment unit, towards said burner.

7. A system as defined in claim 1, further comprising a cylinder which is mounted in said primary treatment unit and which presents an open interior receiving flames from said burner and which presents an exterior directing eddy currents, formed between said cylinder and an inner periphery of said primary treatment unit, towards said burner.

8. A system as defined in claim 1, wherein said primary treatment unit comprises a rotary drum having said contaminated soil inlet and said exhaust gas outlet located proximate a first end thereof and said remediated soil outlet proximate a second end thereof.

9. A system as defined in claim 8, wherein said drum is a counterflow drum the second end of which receives heat from said burner.

10. A system as defined in claim 1, further comprising a secondary treatment unit which oxidizes gases exhausted from said exhaust gas outlet of said primary treatment unit;

means for supplying dilution air to said exhaust gases;

means for
  (1) sensing the level of contaminants in said exhaust gases,
  (2) calculating a lower explosive limit of said exhaust gases, and for
  (3) determining a flow rate of dilution air required to maintain the level of contaminants in said exhaust gases below a percentage of said lower explosive limit; and means for controlling said means for supplying so that said determined flow rate of dilution air is supplied to said exhaust gases.

11. A system as defined in claim 10, wherein said means for sensing comprises a flame ionization detector.

12. A system as defined in claim 10, wherein said means for supplying comprises a variable restriction damper and a motor which is actuated by said means for controlling to control the degree of restriction provided by said damper.

13. A system for the remediation of highly contaminated soil, comprising:

a primary treatment unit which vaporizes contaminants from said soil, said primary treatment unit having a contaminated soil inlet, a remediated soil outlet, and an exhaust gas outlet;

means for supplying dilution air to gases exhausted from said primary treatment unit; and means for controlling said means for supplying so as to supply a flow rate of dilution air to said gases at a designated temperature.

14. A system for the remediation of highly contaminated soil, comprising:

a primary treatment unit which vaporizes contaminants from said soil, said primary treatment unit having a contaminated soil inlet, a remediated soil outlet, and an exhaust gas outlet;

means for supplying dilution air to gases exhausted from said primary treatment unit;

means for
  (1) sensing the level of contaminants in said exhaust gases,
  (2) calculating a lower explosive limit of said exhaust gases, and for
  (3) determining a flow rate of dilution air required to maintain the level of contaminants in said exhaust gases below a percentage of said lower explosive limit; and means for controlling said means for supplying to supply said determined flow rate of dilution air to said exhaust gases at a designated temperature.

15. A system as defined in claim 13, further comprising a burner which heats the interior of said primary treatment unit to vaporize contaminants in said soil; and an air injection system which injects air into said primary treatment unit between said inlet and said remediated soil outlet so as to oxidize at least some of said vaporized contaminants within said primary treatment unit.

* * * * *

UNITED STATES PATENT AND TRADEMARK OFFICE
CERTIFICATE OF CORRECTION

PATENT NO.   : 5,466,418
DATED        : Nov. 14, 1995
INVENTOR(S)  : Swanson et al.

It is certified that error appears in the above-indentified patent and that said Letters Patent is hereby corrected as shown below:

Column 3, line 60, replace "PREFERRED EMBODIMENTS RESUME"

with --PREFERRED EMBODIMENTS--.

Column 3, between lines 56 and 57, insert as a new, centered, line

--Resume--

Signed and Sealed this

Twenty-seventh Day of February, 1996

Attest:

BRUCE LEHMAN

*Attesting Officer*       *Commissioner of Patents and Trademarks*